(12) United States Patent
Wang et al.

(10) Patent No.: US 7,848,036 B1
(45) Date of Patent: Dec. 7, 2010

(54) EXTERNAL LENS DEVICE AND METHOD FOR MOUNTING SAME

(75) Inventors: Ching-Chung Wang, Taipei (TW); Chen-Ning Hsi, Taipei (TW)

(73) Assignee: Primax Electronics Ltd., Taipei (TW)

( * ) Notice: Subject to any disclaimer, the term of this patent is extended or adjusted under 35 U.S.C. 154(b) by 13 days.

(21) Appl. No.: 12/535,860

(22) Filed: Aug. 5, 2009

(30) Foreign Application Priority Data

Jun. 12, 2009 (TW) .............................. 98119671 A (51) Int. Cl.
*G02B 7/02* (2006.01)
(52) U.S. Cl. ................... 359/827; 359/819; 361/679.02
(58) Field of Classification Search ......... 359/819–830; 361/679.02; D14/317, 356, 432
See application file for complete search history.

(56) References Cited

U.S. PATENT DOCUMENTS

| | | | | |
|---|---|---|---|---|
| 3,882,517 A | * | 5/1975 | Land et al. .................. | 396/198 |
| 4,381,885 A | * | 5/1983 | Coquin ........................ | 359/892 |
| 4,468,102 A | * | 8/1984 | Chikano ...................... | 359/612 |
| 4,893,143 A | * | 1/1990 | Sheng-Huei ................. | 396/530 |
| 6,324,023 B1 | * | 11/2001 | Nagaoka et al. ............. | 359/824 |
| 7,746,585 B2 | * | 6/2010 | Chang ......................... | 359/891 |

* cited by examiner

*Primary Examiner*—Darryl J Collins
(74) *Attorney, Agent, or Firm*—Kirton & McConkie; Evan R. Witt (57) ABSTRACT

An external lens device is mounted in front of a lens of an image pickup device. The external lens device includes a fixer and an external lens. The fixer includes a fixing slot and an alignment slice. The alignment slice includes a first reference mark and a second reference mark. The first reference mark is enclosed by the second reference mark. The first reference mark is arranged in the middle portion of the second reference mark. After the fixer is placed in front of the image pickup device, an outer portion of the second reference mark of the alignment slice is parallel with the lens fastening part of the lens of the image pickup device, the first reference mark is aligned with a center of the lens of the image pickup device, and the second reference mark is concentric with a lens fastening part of the lens.

25 Claims, 10 Drawing Sheets

EXTERNAL LENS DEVICE AND METHOD FOR MOUNTING SAME

FIELD OF THE INVENTION

The present invention relates to an external lens device, and more particularly to an external lens device arranged in front of an image pickup device for providing a special focusing effect.

BACKGROUND OF THE INVENTION

Recently, most commercially available image pickup devices are used for taking photographs or recording video images. With increasing development of digital techniques, text documents are gradually created as electronic files. Generally, text documents are scanned by scanning apparatuses and then saved as electronic files such as PDF (Portable Document Format) files. In a case that no scanning apparatus is connected to the computer, the images of simple documents such as single-sided papers or business cards could be captured by the built-in image pickup device of the computer. The images captured by the built-in image pickup device are usually saved as JPEG (Joint Photographic Experts Group) files. Most users prefer using scanning apparatuses to scan the text documents as PDF files because the texts and signs contained in the PDF files are readable by the computer systems and could be converted as editable text files.

As known, optical character recognition (OCR) is a process of capturing an image of a document and then extracting the texts from that image. Recently, it is possible to analyze images that are captured from the image pickup device by the OCR technique and saved as JPEG files. As a consequence, individual texts or signs contained in the JPEG files are recognized and converted as editable text files. Since the associated OCR techniques are well established, the image pickup device is gradually adopted to obtain electronic files of the documents.

When an image pickup device of a notebook computer is used to capture the image of a document, some difficulties possibly occur. For example, the image pickup device of a typical notebook computer has a focal length of approximately 60 centimeters. For using the image pickup device to capture a full-page image of a document that is fully within the shooting range of the image pickup device, all pixels of the image pickup device need to be utilized to obtain the largest image. Under this circumstance, the distance between the image pickup device and the document is deviated from the preset focal length (i.e. 60 centimeters), and thus the obtained image of the document is usually blurred and fails to be recognized by the naked eyes. After the texts or signs contained in the blurred image are subject to an OCR technique, the recognition rate is insufficient.

For using the image pickup device to obtain a sharp image of the document, an external lens is usually arranged in front of the image pickup device. The use of the external lens could change the preset focal length of the image pickup device in order to capture the image of either a nearby document or a faraway object. Generally, the external lens includes a prime lens or a zoom lens. The prime lens is a photographic lens whose focal length is fixed. The zoom lens is a mechanical assembly of lens elements with the ability to vary its focal length. For mounting the external lens in the front of the image pickup device, a fixing device is necessary for connecting the external lens with the image pickup device. Moreover, the fixing device should have the capability of aligning the external lens with the image pickup device in order to enhance the imaging quality of the image pickup device.

Figure 1:
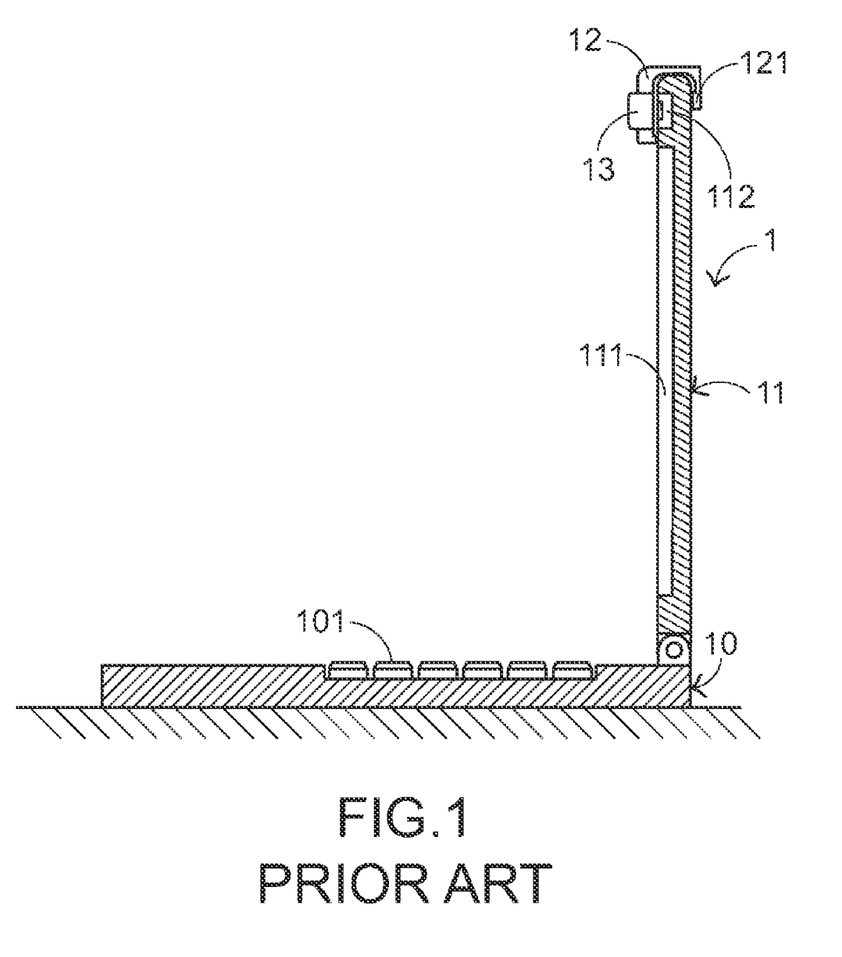
FIG. 1 is a schematic side view illustrating a notebook computer having an external lens device mounted thereon according to the prior art.

FIG. 1 is a schematic side view illustrating a notebook computer having an external lens device mounted thereon according to the prior art. As shown in FIG. 1, the notebook computer 1 comprises a base 10 and an upper cover 11. A keyboard 101 is mounted on the base 10. Via the keyboard 101, the user may input characters or signs. The upper cover 11 comprises a screen 111 and an image pickup device 112. The image pickup device 112 is disposed on an upper edge of the upper cover 11 for capturing an image of a document. The screen 111 is used for showing the operating conditions of the notebook computer 1. In a case that an image is captured by the image pickup device 112, the image is shown on the screen 111. As shown in FIG. 1, the fixing device 12 comprises a hooking element 121, which is attached onto the upper cover 11 of the notebook computer 1. After the hooking element 121 is attached onto the upper cover 11, the fixing device 12 is connected with the notebook computer 1. Since the external lens 13 is connected with the fixing device 12, the external lens 13 will be arranged in front of the image pickup device 112.

As shown in FIG. 1, an example of the external lens 13 is a close-up lens. After the external lens 13 is mounted in front of the image pickup device 112 by the fixing device 12, the preset focal length of the image pickup device 112 is shortened to capture an image of a nearby document through the external lens 13. Conventionally, no proper alignment tool is used for facilitating the user to align the external lens 13 with the lens of the image pickup device 112 after the external lens 13 is mounted in front of the image pickup device 112. If the external lens 13 is not precisely aligned with the lens of the image pickup device 112, the imaging quality of the image pickup device 112 is deteriorated. Conventionally, the user could visually discriminate whether the external lens 13 is aligned with the lens of the image pickup device 112. Since no objective alignment tool is used, the imaging quality of the image pickup device 112 is usually deteriorated.

SUMMARY OF THE INVENTION

It is an object of the present invention to provide an external lens device for facilitating the user to easily align an external lens with a lens of an image pickup device.

Another object of the present invention provides an external lens mounting method for mounting an external lens and aligning the external lens with a lens of an image pickup device.

In accordance with an aspect of the present invention, there is provided an external lens mounting method for mounting an external lens in front of a lens of an image pickup device. The lens has a lens fastening part. The external lens mounting method includes the following steps. Firstly, a fixer having an alignment slice and a fixing slot is provided. The alignment slice includes a first reference mark and a second reference mark. The first reference mark is enclosed by the second reference mark. The first reference mark is arranged in a middle portion of the second reference mark. Then, the fixer is placed in front of the lens of the image pickup device. An outer portion of the second reference mark of the alignment slice is parallel with the lens fastening part of the lens of the image pickup device. The first reference mark is aligned with a center of the lens of the image pickup device. The second reference mark is concentric with the lens fastening part. Then, the alignment slice is moved such that the lens of the image pickup device is not sheltered by the alignment slice. Afterwards, the external lens is fixed in the fixing slot of the fixer.

In an embodiment, the fixer further includes a gliding recess and an opening. The gliding recess is formed in the fixing slot for receiving the alignment slice. The opening is formed in the fixing slot. When the fixer is placed in front of the image pickup device, the lens of the image pickup device is permitted to perform a shooting operating through the opening.

In an embodiment, the image pickup device is a web camera mounted on a notebook computer. In addition, the fixer is a U-shaped fixer for clamping the notebook computer.

In an embodiment, the alignment slice is transparent and made of plastic material or Mylar.

In an embodiment, the alignment slice is integrated into the fixer via an adhesive.

In an embodiment, the image pickup device is a web camera mounted on a notebook computer. In addition, the fixer is a thin fixing slice module, which is connected with the notebook computer via an adhesive and arranged in front of the image pickup device.

In an embodiment, the first reference mark is a dot mark, and the second reference mark is a ring-shaped mark.

In an embodiment, the external lens is a zoom lens with a variable focal length for changing the focal length of the image pickup device.

In accordance with another aspect of the present invention, there is provided an external lens mounting method for mounting an external lens in front of a lens of an image pickup device. The lens has a lens fastening part. The external lens mounting method includes the following steps. Firstly, a fixer having an alignment slice and a fixing slot is provided. The alignment slice includes a first reference mark and a second reference mark. The first reference mark is enclosed by the second reference mark. The first reference mark is arranged in a middle portion of the second reference mark. Then, the fixer is placed in front of the lens of the image pickup device. An outer portion of the second reference mark of the alignment slice is parallel with the lens fastening part of the lens of the image pickup device. The first reference mark is aligned with a center of the lens of the image pickup device. The second reference mark is concentric with the lens fastening part. Then, the external lens is fixed in the fixing slot of the fixer. Afterwards, the alignment slice is moved such that the lens of the image pickup device is not sheltered by the alignment slice.

In an embodiment, the fixer further includes a gliding recess and an opening. The gliding recess is formed in the fixing slot for receiving the alignment slice. The opening is formed in the fixing slot. When the fixer is placed in front of the image pickup device, the lens of the image pickup device is permitted to perform a shooting operating through the opening.

In an embodiment, the image pickup device is a web camera mounted on a notebook computer.

In an embodiment, the fixer is a U-shaped fixer for clamping the notebook computer.

In accordance with a further aspect of the present invention, there is provided an external lens device mounted in front of a lens of an image pickup device. The lens has a lens fastening part. The external lens device includes a fixer and an external lens. The fixer is arranged in front of the image pickup device. The fixer has an alignment slice and a fixing slot. The alignment slice includes a first reference mark and a second reference mark. The first reference mark is enclosed by the second reference mark. The first reference mark is arranged in a middle portion of the second reference mark. The external lens is arranged on the fixer and aligned with the lens of the image pickup device. When the fixer is placed in front of the image pickup device, an outer portion of the second reference mark of the alignment slice is parallel with the lens fastening part of the lens of the image pickup device, the first reference mark is aligned with a center of the lens of the image pickup device, and the second reference mark is concentric with the lens fastening part.

In an embodiment, the fixer further includes a gliding recess and an opening. The gliding recess is formed in the fixing slot for receiving the alignment slice. The opening is formed in the fixing slot. When the fixer is placed in front of the image pickup device, the lens of the image pickup device is permitted to perform a shooting operating through the opening.

In an embodiment, the image pickup device is a web camera mounted on a notebook computer. In addition, the fixer is a U-shaped fixer for clamping the notebook computer.

In an embodiment, the alignment slice is transparent and made of plastic material or Mylar.

In an embodiment, the alignment slice is integrated into the fixer via an adhesive.

In an embodiment, the image pickup device is a web camera mounted on a notebook computer. In addition, the fixer is a thin fixing slice module, which is connected with the notebook computer via an adhesive and arranged in front of the image pickup device.

In an embodiment, the alignment slice is transparent and made of plastic material or Mylar.

In an embodiment, the first reference mark is a dot mark, and the second reference mark includes multiple dots, which are discretely arranged at regular intervals to form a ring-shaped dot pattern.

In an embodiment, the external lens is a prime lens with several different fixed focal lengths for changing the focal length of the image pickup device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
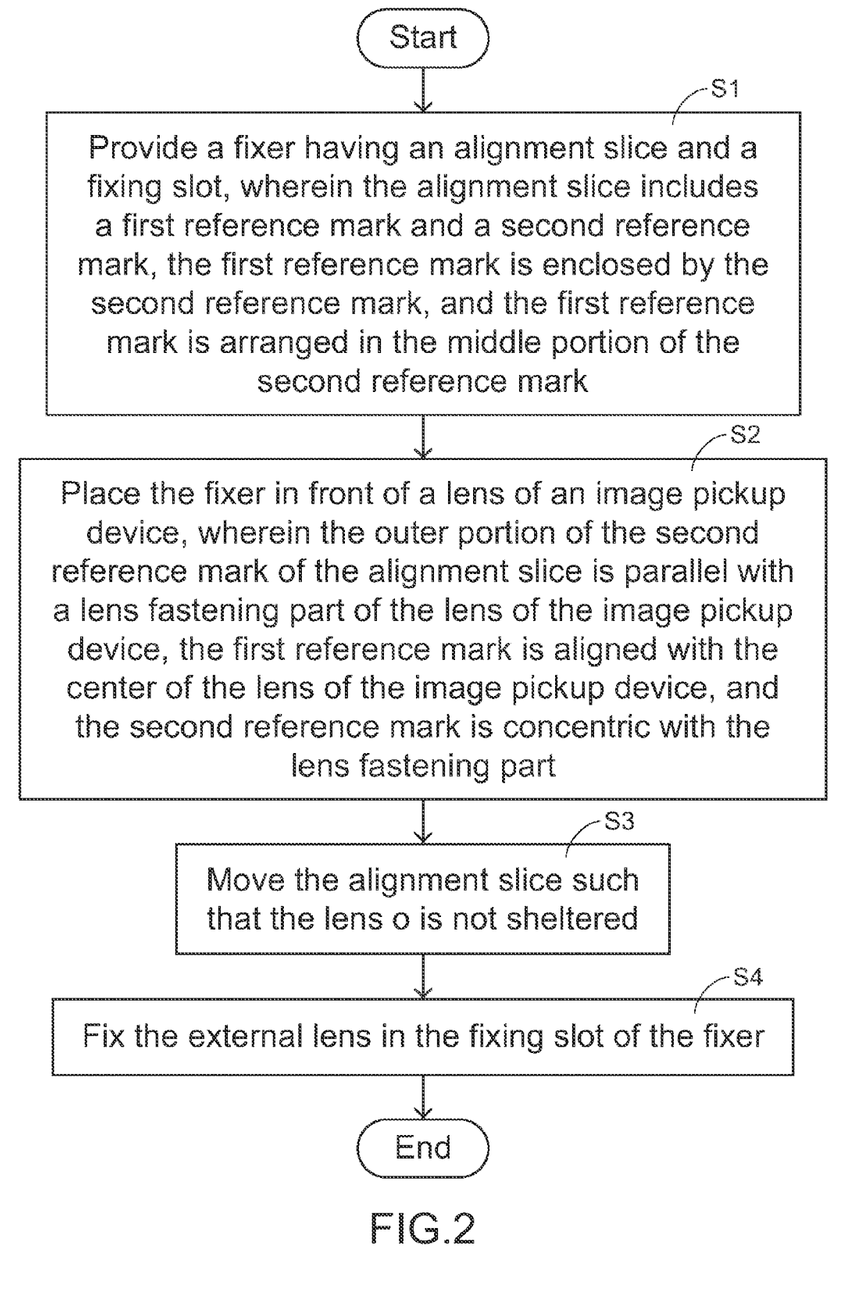
FIG. 2 is a flowchart illustrating an external lens mounting method according to a first embodiment of the present invention.

The present invention provides an external lens mounting method. FIG. 2 is a flowchart illustrating an external lens mounting method according to a first embodiment of the present invention. First of all, in Step S1, a fixer having an alignment slice and a fixing slot is provided, wherein the alignment slice includes a first reference mark and a second reference mark, the first reference mark is enclosed by the second reference mark, and the first reference mark is arranged in the middle portion of the second reference mark. In Step S2, the fixer is placed in front of a lens of an image pickup device. As such, the outer portion of the second reference mark of the alignment slice is parallel with a lens fastening part of the lens of the image pickup device, the first reference mark is aligned with the center of the lens of the image pickup device, and the second reference mark is concentric with the lens fastening part. In Step S3, the alignment slice is moved such that the lens of the image pickup device is not sheltered by the alignment slice. In Step S4, the external lens is fixed in the fixing slot of the fixer. Meanwhile, the process of mounting the external lens is completed.

The external lens device of the present invention comprises a fixer and an external lens. The fixer comprises an alignment slice and a fixing slot. The alignment slice comprises a first reference mark and a second reference mark. In an embodiment, the fixer is connected to an image pickup device via an adhesive, wherein the external lens is mounted on the image pickup device. In some embodiments, the fixer further comprises a gliding recess and an opening. Hereinafter, the configurations of the external lens device will be illustrated in more details.

Figure 3A:
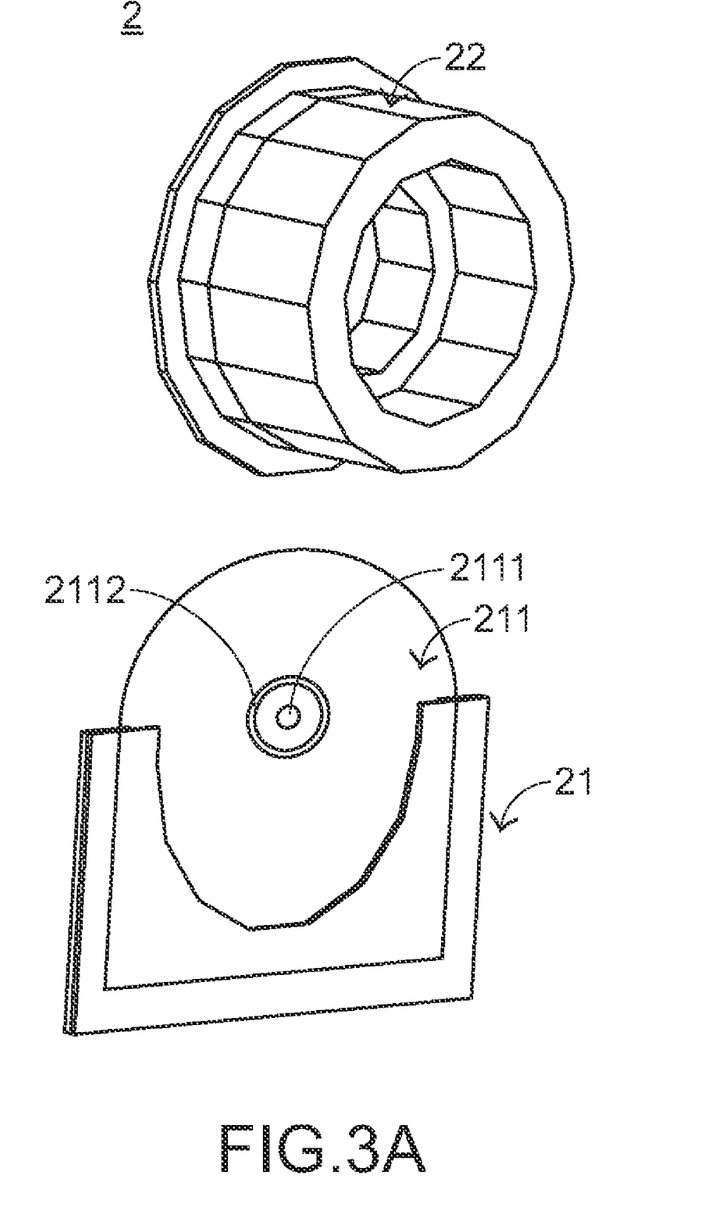
FIGS. 3A and 3B are schematic perspective views illustrating an exemplary external lens device of the present invention.
Figure 3B:
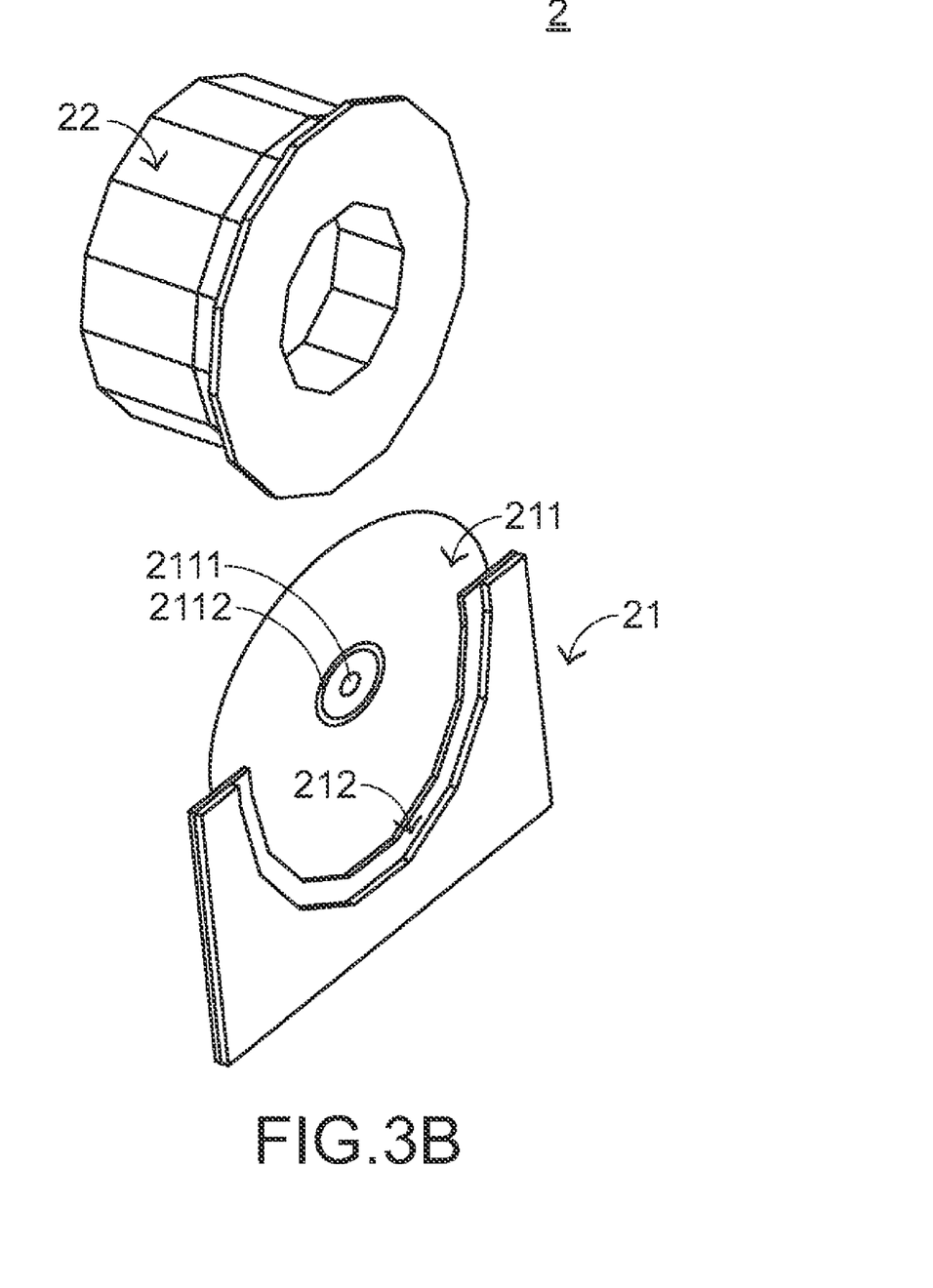

FIGS. 3A and 3B are schematic perspective views illustrating an exemplary external lens device of the present invention. As shown in FIGS. 3A and 3B, the external lens device 2 comprises a fixer 21 and an external lens 22. The fixer 21 comprises an alignment slice 211 and a fixing slot 212. The fixing slot 212 is used for accommodating the external lens 22. An example of the external lens 22 includes but is not limited to a prime lens or a zoom lens. The prime lens is a photographic lens whose focal length is fixed. The zoom lens is a mechanical assembly of lens elements with the ability to vary its focal length. In this embodiment, the external lens 22 is a zoom lens with the ability to vary its focal length. The alignment slice 211 includes a first reference mark 2111 and a second reference mark 2112. The first reference mark 2111 is enclosed by the second reference mark 2112. The first reference mark 2111 is arranged in the middle portion of the second reference mark 2112. In this embodiment, the fixer 21 is a thin fixing slice module. The first reference mark 2111 is a dot mark. The second reference mark 2112 is a ring-shaped mark. The alignment slice 211 is transparent and made of plastic material or Mylar. In addition, the alignment slice 211 is integrated into the fixer 21 via an adhesive (not shown).

Figure 4:
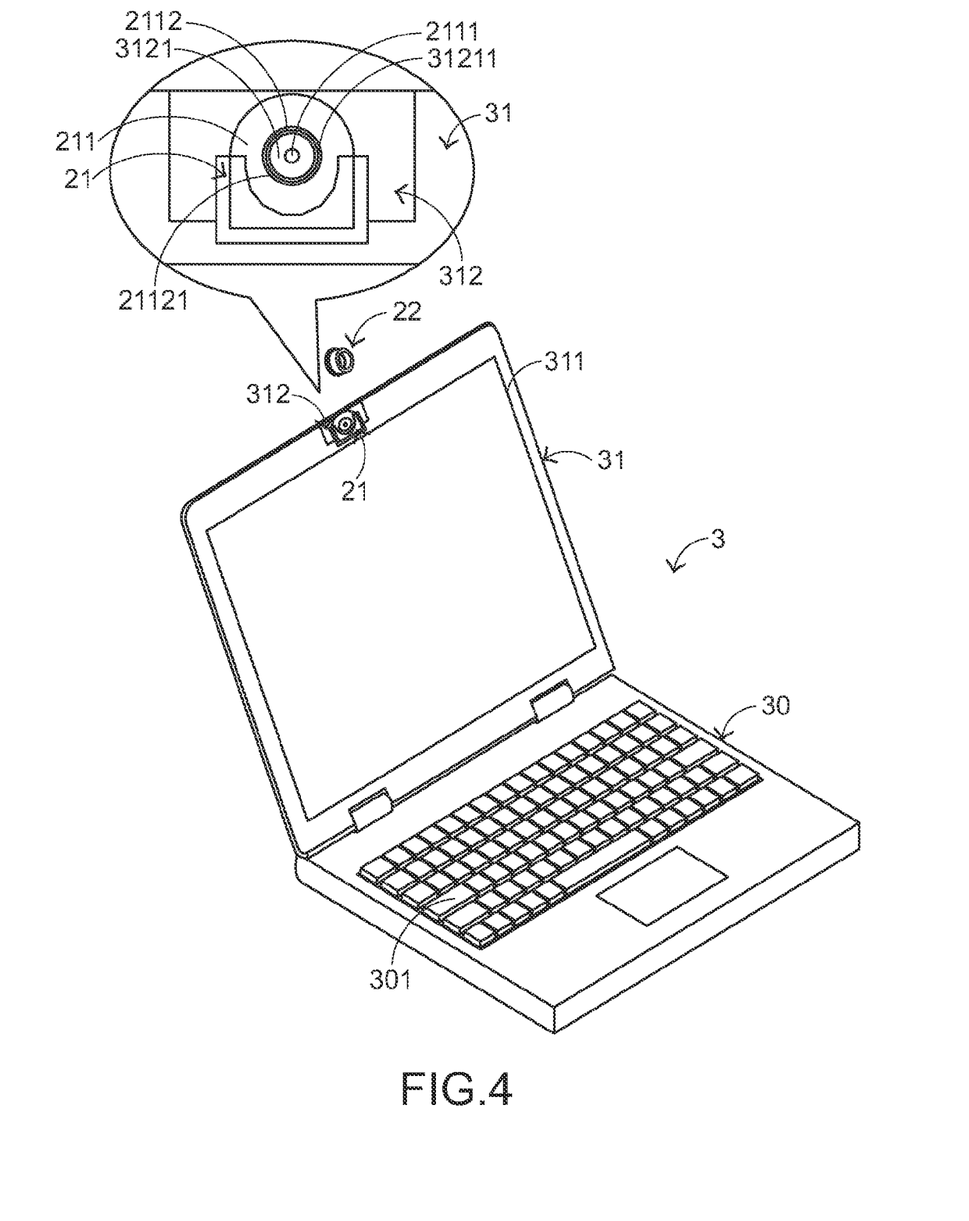
FIG. 4 is a schematic perspective view illustrating the external lens device of FIG. 3 that is mounted on a notebook computer.

After the fixer 21 is provided (Step S1), the fixer 21 is placed in front of a lens of an image pickup device (Step S2). In this embodiment, the image pickup device is mounted on a notebook computer. FIG. 4 is a schematic perspective view illustrating the external lens device of FIG. 3 that is mounted on a notebook computer. As shown in FIG. 4, the notebook computer 3 comprises a base 30 and an upper cover 31. The base 30 includes a keyboard 301. Via the keyboard 301, the user may input characters or signs. The upper cover 31 comprises a screen 311 and an image pickup device 312. The image pickup device 312 is disposed on an upper edge of the upper cover 31. An example of the image pickup device 312 is a web camera. The image pickup device 312 includes a lens 3121. The lens 3121 has a lens fastening part 31211. The lens fastening part 31211 is disposed on a periphery of the lens 3121 for fixing the lens 3121.

For placing the fixer 21 in front of the lens 3121 of the image pickup device 312 (Step S2), the outer portion 21121 of the second reference mark 2112 of the alignment slice 211 is parallel with the lens fastening part 31211 of the lens 3121 of the image pickup device 312. In this embodiment, the lens fastening part 31211 and the outer portion 21121 of the second reference mark 2112 have substantially identical size. As such, after the second reference mark 2112 is aligned with the lens fastening part 31211, the outer portion 21121 of the second reference mark 2112 will be parallel with the lens fastening part 31211. That is, the second reference mark 2112 is concentric with the lens fastening part 31211. Under this circumstance, the first reference mark 2111, which is arranged in the middle portion of the second reference mark 2112, is aligned with the center of the lens 3121 of the image pickup device 312. As shown in FIG. 4, the fixer 21 is connected to a front end of the image pickup device 312 via an adhesive (not shown).

Next, the alignment slice 211 is moved such that the lens 3121 of the image pickup device 312 is not sheltered by the alignment slice 211 (Step S3). Since the alignment slice 211 is adhered onto the fixer 21, the alignment slice 211 needs to be detached from the fixer 21, so that the lens 3121 is not sheltered by the alignment slice 211. If the alignment slice 211 is not detached from the fixer 21, the external lens 22 will be hindered by the alignment slice 211 from being placed in the fixing slot 212.

Figure 5:
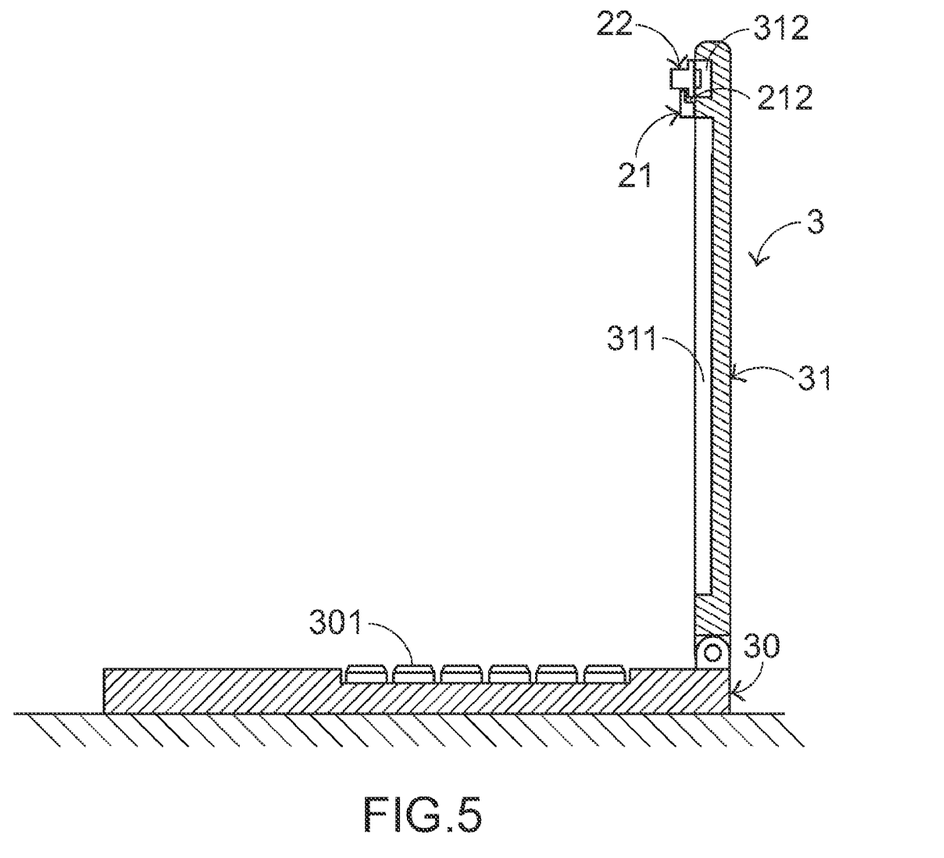
FIG. 5 is a schematic side view illustrating the external lens device of FIG. 3 that is mounted on a notebook computer.

After the alignment slice 211 is moved, the external lens 22 is fixed in the fixing slot 212 of the fixer 21 (see FIG. 5). By the way, the positions of the fixer 21 and the fixing slot 212 and the position for attaching the alignment slice 211 have been elaborately calculated. In other words, after the alignment slice 211 is aligned with the lens 3121 according to the reference marks, the fixer 21 is connected to a front end of the image pickup device 312 and the external lens 22 is fixed in the fixing slot 212 of the fixer 21, the external lens 22 will be aligned with the lens 3121 of the image pickup device 312. Meanwhile, the image of the document could be captured by the image pickup device 312.

Figure 6:
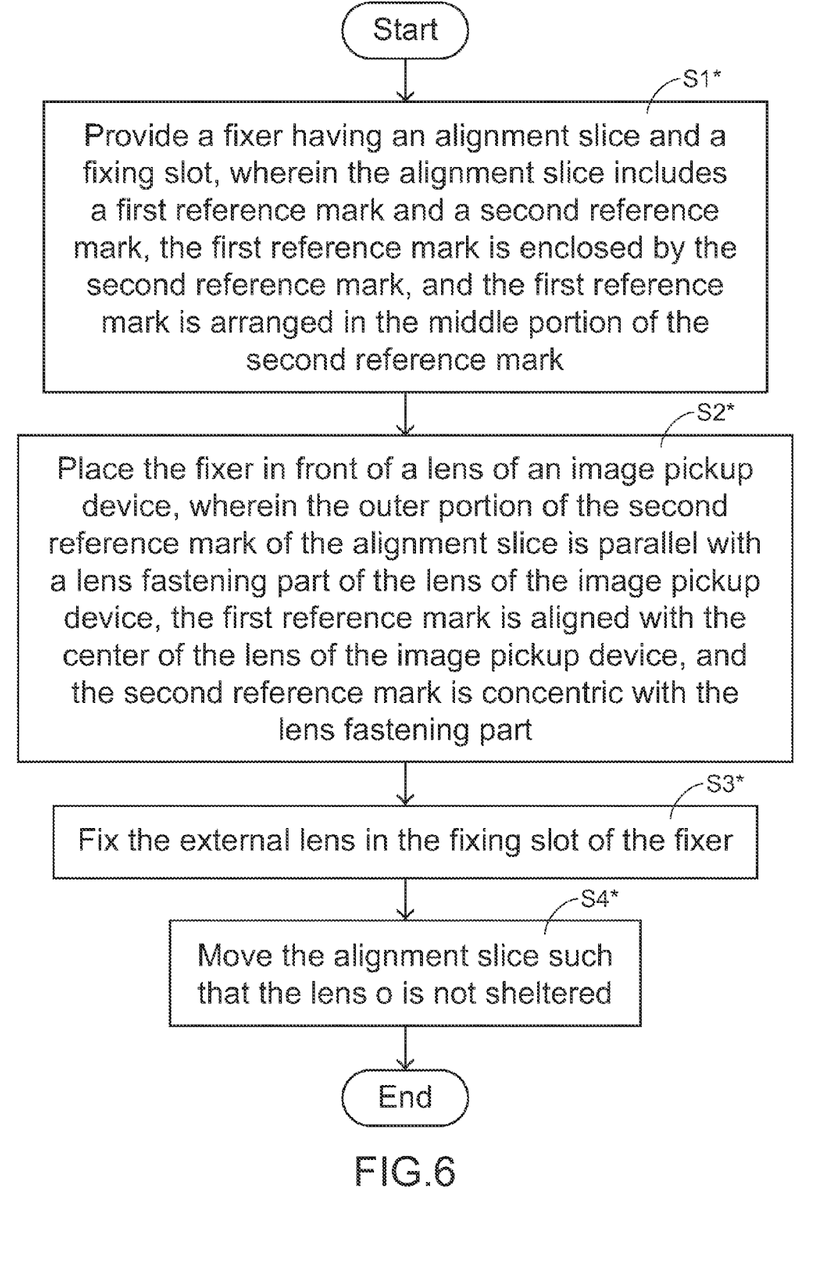
FIG. 6 is a flowchart illustrating an external lens mounting method according to a second embodiment of the present invention.

It is noted that, however, those skilled in the art will readily observe that numerous modifications and alterations may be made while retaining the teachings of the invention. FIG. 6 is a flowchart illustrating an external lens mounting method according to a second embodiment of the present invention. First of all, in Step S1*, a fixer having an alignment slice and a fixing slot is provided, wherein the alignment slice includes a first reference mark and a second reference mark, the first reference mark is enclosed by the second reference mark, and the first reference mark is arranged in the middle portion of the second reference mark. In Step S2*, the fixer is placed in front of a lens of an image pickup device. As such, the outer portion of the second reference mark of the alignment slice is parallel with a lens fastening part of the lens of the image pickup device, the first reference mark is aligned with the center of the lens of the image pickup device, and the second reference mark is concentric with the lens fastening part. In Step S3*, the external lens is fixed in the fixing slot of the fixer. In Step S4*, the alignment slice is moved such that the lens of the image pickup device is not sheltered by the alignment slice. Meanwhile, the process of mounting the external lens is completed. When the second embodiment is compared with the first embodiment, the timing of moving the alignment slice is distinguished. Another exemplary external lens device of the present invention could facilitate the user to easily align an external lens with a lens of an image pickup device by the external lens mounting method as described in the first or second embodiment.

Figure 7:
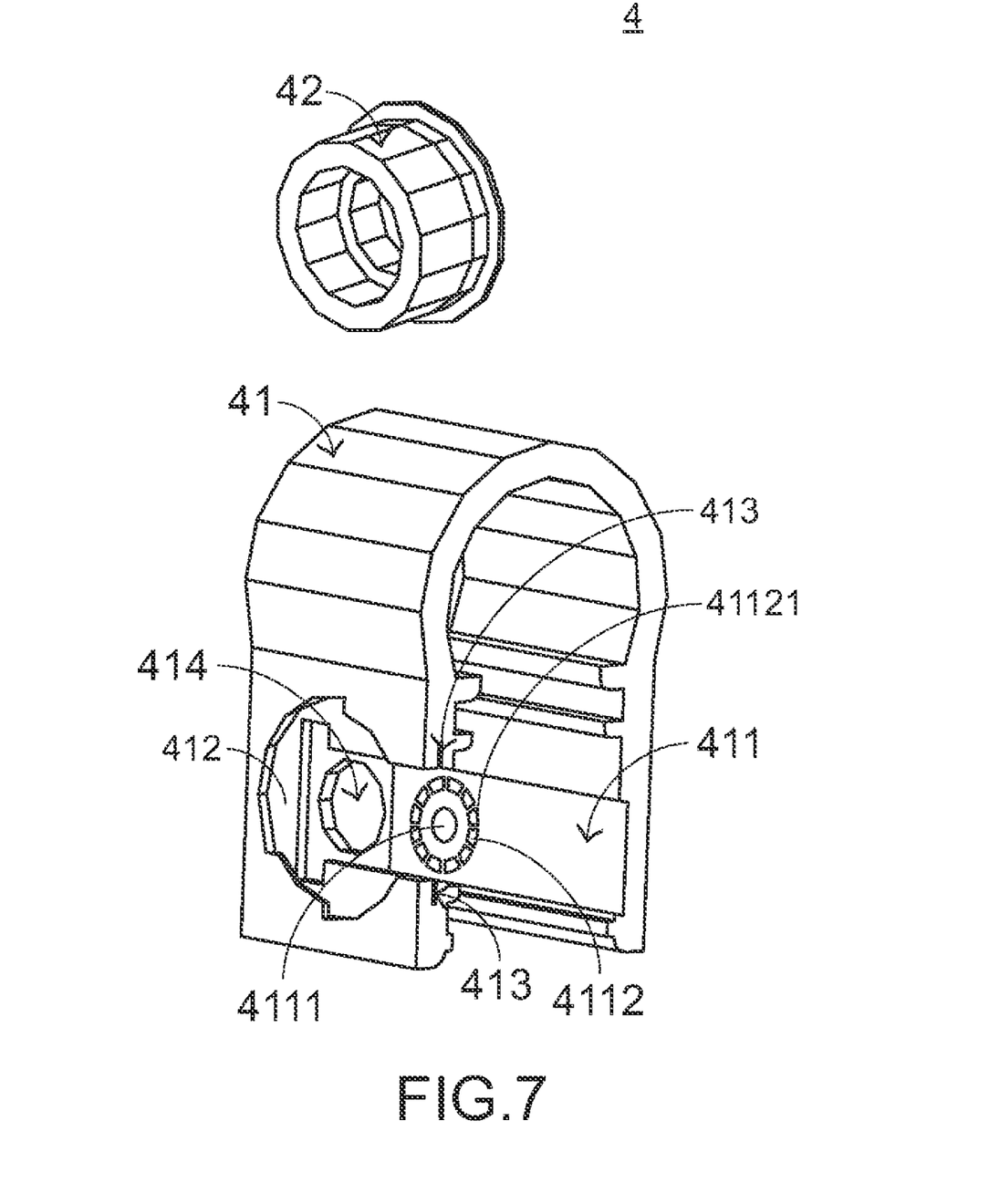
FIG. 7 is a schematic perspective views illustrating another exemplary external lens device of the present invention.

FIG. 7 is a schematic perspective views illustrating another exemplary external lens device of the present invention. As shown in FIG. 7, the external lens device 4 comprises a fixer 41 and an external lens 42. The external lens 42 is a prime lens with several different fixed focal lengths. The fixer 41 comprises an alignment slice 411, a fixing slot 412, a gliding recess 413 and an opening 414. The fixing slot 412 is used for accommodating the external lens 42. The gliding recess 413 and the opening 414 are formed in the fixing slot 412. The structure of the fixing slot 412 is distinguished from that of the fixing slot 212. Due to the specific design of the fixing slot 412, the external lens 42 will not be hindered by the alignment slice 411. Under this circumstance, even if the alignment slice 411 is not moved, the external lens 42 could be fixed in the fixing slot 412.

After the external lens 42 is fixed in the fixing slot 412, the alignment slice 411 still needs to be moved. In this embodiment, the gliding recess 413 is formed in the fixing slot 412 for receiving the alignment slice 411, so that the alignment slice 411 is movable in the gliding recess 413. For utilizing the alignment slice 411 to align the external lens 42 with the lens of the image pickup device, the alignment slice 411 could be moved to the front end of the image pickup device along the gliding recess 413. On the other hand, for using the image pickup device to capture the image of a document, the alignment slice 411 needs to be moved to a position where the opening 414 is not sheltered by the alignment slice 411 (see FIG. 7).

Moreover, the shape of the alignment slice 411 mates with the shapes of the fixing slot 412 and the gliding recess 413. In this embodiment, the alignment slice 411 is T-shaped. The alignment slice 411 includes a first reference mark 4111 and a second reference mark 4112. The first reference mark 4111 is enclosed by the second reference mark 4112. The first reference mark 4111 is arranged in the middle portion of the second reference mark 4112. In addition, the fixer 41 is a U-shaped fixer. The first reference mark 4111 is a dot mark. The second reference mark 4112 includes multiple dots, which are discretely arranged at regular intervals to form a ring-shaped dot pattern. The alignment slice 211 is transparent and made of plastic material or Mylar.

Figure 8:
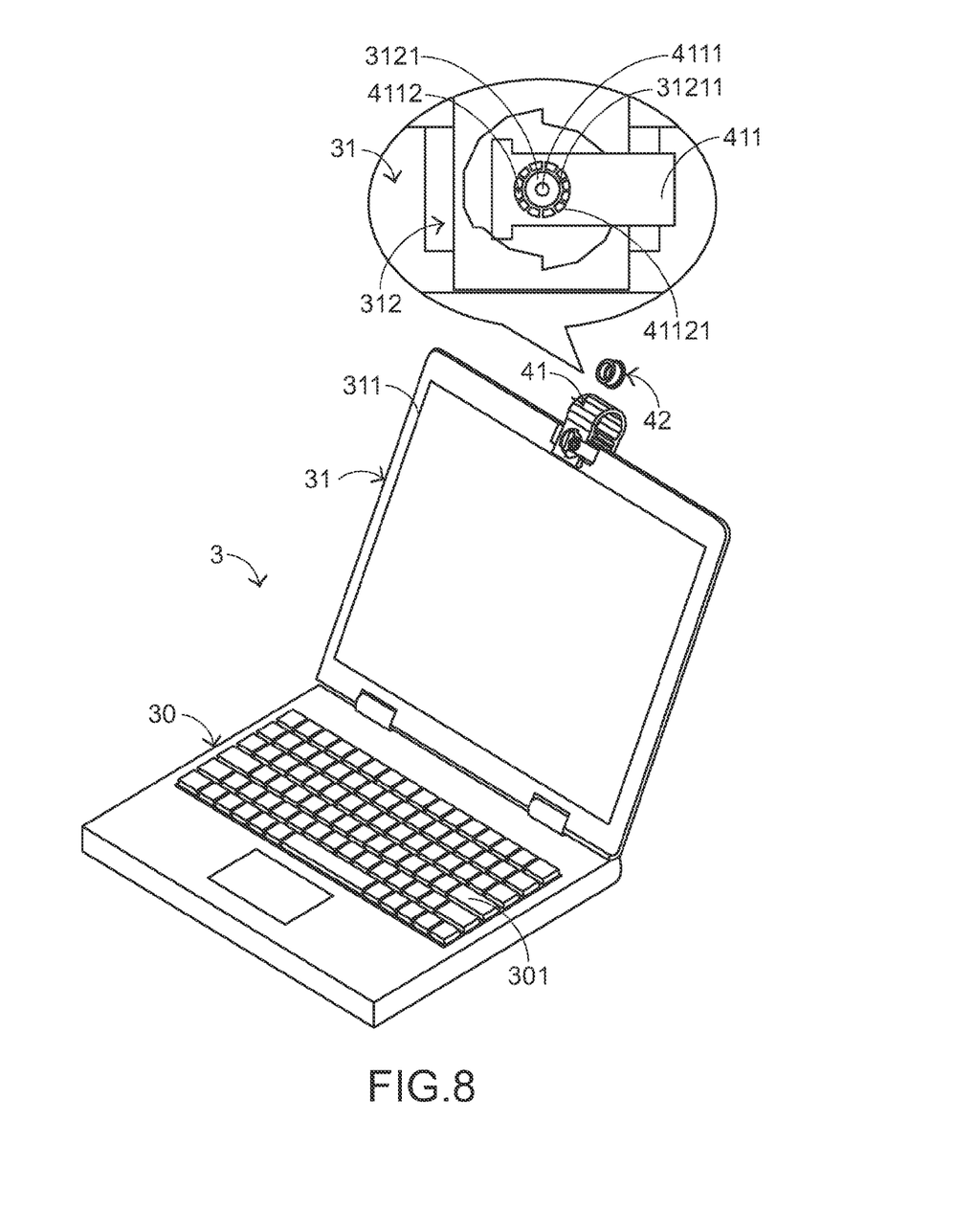
FIG. 8 is a schematic perspective view illustrating the external lens device of FIG. 7 that is mounted on a notebook computer.

After the fixer 41 is provided (Step S1*), the fixer 41 is placed in front of a lens of an image pickup device (Step S2). In this embodiment, the image pickup device is mounted on a notebook computer. FIG. 8 is a schematic perspective view illustrating the external lens device of FIG. 7 that is mounted on a notebook computer. The configurations of the notebook computer 3 are identical to those shown in FIG. 4, and are not redundantly described herein. Similarly, the image pickup device 312 is a web camera that is mounted on the notebook computer 3. The image pickup device 312 includes a lens 3121. The lens 3121 has a lens fastening part 31211. The lens fastening part 31211 is disposed on a periphery of the lens 3121 for fixing the lens 3121.

For placing the fixer 41 in front of the lens 3121 of the image pickup device 312 (Step S2*), the outer portion 41121 of the second reference mark 4112 of the alignment slice 411 is parallel with the lens fastening part 41211 of the lens 3121 of the image pickup device 312. Since the fixer 41 is U-shaped, the lens 3121 is sheltered by the fixer 41 and the fixer 41 fails to be aligned with the lens 3121 after the fixer 41 is placed in front of the lens 3121 of the image pickup device 312. For preventing the lens 3121 from being sheltered by the fixer 41, the opening 414 is formed in the fixing slot 412 of the fixer 41. After the fixer 41 is placed in front of the lens 3121 of the image pickup device 312, the lens 3121 will be aligned with the opening 414, and thus the lens 3121 is permitted to perform a shooting operating through the opening 414. In this embodiment, since the lens fastening part 31211 is smaller than the outer portion 41121 of the second reference mark 4112, the second reference mark 4112 fails to be directly aligned with the lens fastening part 31211. For achieving an aligning purpose, the alignment slice 411 is shifted such that the outer portion 41121 of the second reference mark 4112 is parallel with the lens fastening part 31211. That is, the second reference mark 4112 is concentric with the lens fastening part 31211. Under this circumstance, the first reference mark 4111, which is arranged in the middle portion of the second reference mark 4112, is aligned with the center of the lens 3121 of the image pickup device 312. As shown in FIG. 8, the fixer 41 is attached on the upper edge of the notebook computer 3 by a clamping means and is arranged in front of the image pickup device 312.

After the alignment slice 411 is placed in front of the image pickup device 312, the external lens 42 is fixed in the fixing slot 412 of the fixer 41 (Step S3*). Although the external lens 42 is aligned with the lens 3121 of the image pickup device 312 at this moment, the shooting operation fails to be done because the opening 414 of the fixer 41 and the lens 3121 are sheltered by the alignment slice 411.

Next, the alignment slice 411 is moved such that the lens 3121 is not sheltered by the alignment slice 411 (Step S4*). Please refer to FIG. 7 again. Since the gliding recess 413 is formed in the fixing slot 412, the alignment slice 411 could be moved in the gliding recess 413 to a position where the lens 3121 is not sheltered by the alignment slice 411. By the way, the positions of the fixer 41, the fixing slot 412, the opening 414 and the alignment slice 411 have been elaborately calculated. In other words, after the alignment slice 411 is aligned with the lens 4121 according to the reference marks and the external lens 42 is fixed in the fixing slot 412, the external lens 42 will be aligned with the lens 3121 of the image pickup device 312. Meanwhile, the image of the document could be captured by the image pickup device 312.

Figure 9:
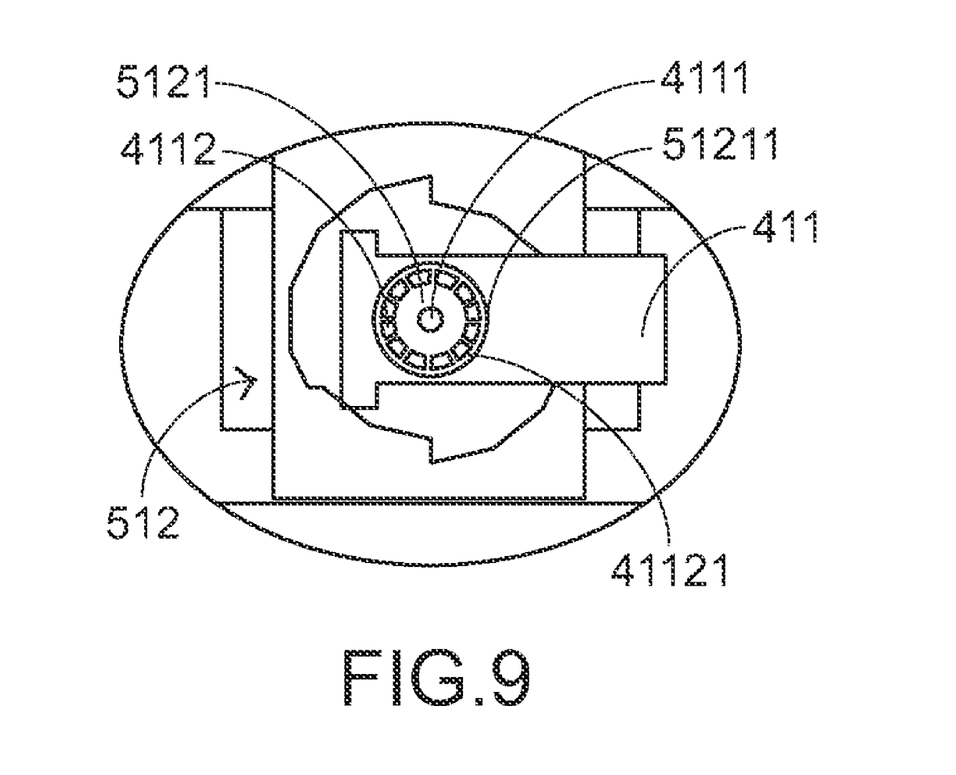
FIG. 9 is a schematic view illustrating the use of the alignment slice of the external lens device of FIG. 7 to align the external lens with a lens of another image pickup device.

FIG. 9 is a schematic view illustrating the use of the alignment slice of the external lens device of FIG. 7 to align the external lens with a lens of another image pickup device. The external lens device 4 is placed of another image pickup device 512. The image pickup device 512 includes a lens 5121. The lens 5121 has a lens fastening part 51211. In this embodiment, since the lens fastening part 51211 is smaller than the outer portion 41121 of the second reference mark 4112, the second reference mark 4112 fails to be directly aligned with the lens fastening part 51211. For achieving an aligning purpose, the alignment slice 411 is shifted such that the outer portion 41121 of the second reference mark 4112 is parallel with the lens fastening part 51211. That is, the second reference mark 4112 is concentric with the lens fastening part 51211. Under this circumstance, the first reference mark 4111, which is arranged in the middle portion of the second reference mark 4112, is aligned with the center of the lens 5121 of the image pickup device 512. Meanwhile, the fixer 41 is successfully mounted. The follow-up procedures are similar to those described above, and are not redundantly described herein.

From the above description, the external lens mounting method of the present invention is capable of mounting an external lens and aligning the external lens with a lens of an image pickup device. The external lens device 2 described in the first embodiment of the present invention has simplified structure, small volume and low cost, and is easily fabricated. Whereas, the external lens device 4 described in the second embodiment of the present invention has more precise structure. The alignment slice of the external lens device 4 is movable to a position where the lens of the image pickup device is not sheltered. In addition, the alignment slice of the external lens device 4 is reusable and easily to be operated. Therefore, the external lens device of the present invention is effective for enhancing the imaging quality of the image pickup device, thereby obviating the drawbacks encountered from the prior art.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An external lens mounting method for mounting an external lens in front of a lens of an image pickup device, said lens having a lens fastening part, said external lens mounting method comprising steps of:
   providing a fixer having an alignment slice and a fixing slot, wherein said alignment slice includes a first reference mark and a second reference mark, said first reference mark is enclosed by said second reference mark, and said first reference mark is arranged in a middle portion of said second reference mark;
   placing said fixer in front of said lens of said image pickup device, wherein an outer portion of said second reference mark of said alignment slice is parallel with said lens fastening part of said lens of said image pickup device, said first reference mark is aligned with a center of said lens of said image pickup device, and said second reference mark is concentric with said lens fastening part;
   moving said alignment slice such that said lens of said image pickup device is not sheltered by said alignment slice; and
   fixing said external lens in said fixing slot of said fixer.

2. The external lens mounting method according to claim 1 wherein said fixer further comprises:
   a gliding recess formed in said fixing slot for receiving said alignment slice; and
   an opening formed in said fixing slot, wherein when said fixer is placed in front of said image pickup device, said lens of said image pickup device is permitted to perform a shooting operating through said opening.

3. The external lens mounting method according to claim 1 wherein said image pickup device is a web camera mounted on a notebook computer.

4. The external lens mounting method according to claim 3 wherein said fixer is a U-shaped fixer for clamping said notebook computer.

5. The external lens mounting method according to claim 1 wherein said alignment slice is transparent and made of plastic material or Mylar.

6. The external lens mounting method according to claim 1 wherein said alignment slice is integrated into said fixer via an adhesive.

7. The external lens mounting method according to claim 6 wherein said image pickup device is a web camera mounted on a notebook computer.

8. The external lens mounting method according to claim 7 wherein said fixer is a thin fixing slice module, which is connected with said notebook computer via an adhesive and arranged in front of said image pickup device.

9. The external lens mounting method according to claim 1 wherein said first reference mark is a dot mark, and said second reference mark is a ring-shaped mark.

10. The external lens mounting method according to claim 1 wherein said external lens is a zoom lens with a variable focal length for changing the focal length of said image pickup device.

11. An external lens mounting method for mounting an external lens in front of a lens of an image pickup device, said lens having a lens fastening part, said external lens mounting method comprising steps of:
   providing a fixer having an alignment slice and a fixing slot, wherein said alignment slice includes a first reference mark and a second reference mark, said first reference mark is enclosed by said second reference mark, and said first reference mark is arranged in a middle portion of said second reference mark;
   placing said fixer in front of said lens of said image pickup device, wherein an outer portion of said second reference mark of said alignment slice is parallel with said lens fastening part of said lens of said image pickup device, said first reference mark is aligned with a center of said lens of said image pickup device, and said second reference mark is concentric with said lens fastening part;
   fixing said external lens in said fixing slot of said fixer; and
   moving said alignment slice such that said lens of said image pickup device is not sheltered by said alignment slice.

12. The external lens mounting method according to claim 11 wherein said fixer further comprises:
   a gliding recess formed in said fixing slot for receiving said alignment slice; and
   an opening formed in said fixing slot, wherein when said fixer is placed in front of said image pickup device, said lens of said image pickup device is permitted to perform a shooting operating through said opening.

13. The external lens mounting method according to claim 11 wherein said image pickup device is a web camera mounted on a notebook computer.

14. The external lens mounting method according to claim 13 wherein said fixer is a U-shaped fixer for clamping said notebook computer.

15. An external lens device mounted in front of a lens of an image pickup device, said lens having a lens fastening part, said external lens device comprising:
   a fixer arranged in front of said image pickup device, said fixer having an alignment slice and a fixing slot, wherein said alignment slice includes a first reference mark and a second reference mark, said first reference mark is enclosed by said second reference mark, and said first reference mark is arranged in a middle portion of said second reference mark; and
   an external lens arranged on said fixer and aligned with said lens of said image pickup device, wherein when said fixer is placed in front of said image pickup device, an outer portion of said second reference mark of said alignment slice is parallel with said lens fastening part of said lens of said image pickup device, said first reference mark is aligned with a center of said lens of said image pickup device, and said second reference mark is concentric with said lens fastening part.

16. The external lens device according to claim 15 wherein said fixer further comprises:
  a gliding recess formed in said fixing slot for receiving said alignment slice; and
  an opening formed in said fixing slot, wherein when said fixer is placed in front of said image pickup device, said lens of said image pickup device is permitted to perform a shooting operating through said opening.

17. The external lens device according to claim 15 wherein said image pickup device is a web camera mounted on a notebook computer.

18. The external lens device according to claim 17 wherein said fixer is a U-shaped fixer for clamping said notebook computer.

19. The external lens device according to claim 15 wherein said alignment slice is transparent and made of plastic material or Mylar.

20. The external lens device according to claim 15 wherein said alignment slice is integrated into said fixer via an adhesive.

21. The external lens device according to claim 20 wherein said image pickup device is a web camera mounted on a notebook computer.

22. The external lens device according to claim 21 wherein said fixer is a thin fixing slice module, which is connected with said notebook computer via an adhesive and arranged in front of said image pickup device.

23. The external lens device according to claim 20 wherein said alignment slice is transparent and made of plastic material or Mylar.

24. The external lens device according to claim 15 wherein said first reference mark is a dot mark, and said second reference mark includes multiple dots, which are discretely arranged at regular intervals to form a ring-shaped dot pattern.

25. The external lens device according to claim 15 wherein said external lens is a prime lens with several different fixed focal lengths for changing the focal length of said image pickup device.

\* \* \* \* \*